US012771803B2

(12) United States Patent
Chang et al.

(10) Patent No.: US 12,771,803 B2
(45) Date of Patent: Oct. 20, 2026

(54) TELEPROMPTER

(71) Applicant: ELGATO IDISPLAY LIMITED, New Taipei City (TW)

(72) Inventors: Yu-Cheng Chang, New Taipei City (TW); Chin-Wei Hsu, New Taipei City (TW); Shang-Fu Wang, New Taipei City (TW); Chia-Hsin Tsai, New Taipei City (TW)

(73) Assignee: ELGATO IDISPLAY LIMITED, New Taipei City (TW)

( * ) Notice: Subject to any disclaimer, the term of this patent is extended or adjusted under 35 U.S.C. 154(b) by 382 days.

(21) Appl. No.: 18/583,793

(22) Filed: Feb. 21, 2024

(65) Prior Publication Data

US 2025/0133180 A1 Apr. 24, 2025

(30) Foreign Application Priority Data

Oct. 24, 2023 (TW) ................................ 112140480

(51) Int. Cl.
*H04N 5/222* (2006.01)

(52) U.S. Cl.
CPC ................................ *H04N 5/2222* (2013.01)

(58) Field of Classification Search
CPC .. H04N 5/00–956; H04N 7/142; H04N 7/144; H04N 7/15; G02B 30/56; G06F 3/0386; G06F 1/1616; G06Q 10/10; G06Q 10/1053; G06Q 30/02; G11B 27/034; G11B 27/34; G11B 2220/90; G09B 5/065; G10L 15/26
See application file for complete search history.

(56) References Cited

U.S. PATENT DOCUMENTS 10,491,785 B1 * 11/2019 Arnot .................. H04N 5/2222

FOREIGN PATENT DOCUMENTS

| | | |
|---|---|---|
| CN | 212324183 U | 1/2021 |
| CN | 213693844 U | 7/2021 |
| CN | 213754636 U | 7/2021 |
| CN | 213754637 U | 7/2021 |
| CN | 216813494 U | 6/2022 |
| CN | 217590938 U | 10/2022 |
| CN | 217762844 U | 11/2022 |
| JP | 200294835 A | 3/2002 |
| TW | M611510 U | 5/2021 |

* cited by examiner

*Primary Examiner* — Christopher A Lamb, II
(74) *Attorney, Agent, or Firm* — Li & Cai Intellectual Property Office

(57) ABSTRACT

A teleprompter includes a connecting bracket, a prompting optical mechanism, a transferring board, and a supporting seat. The connecting bracket is used to support a monitor assembly. The prompting optical mechanism includes a main housing, a front frame, a rear frame, and a splitter. The transferring board is detachably connected to the rear frame. The transferring board has a photography opening. The supporting seat has an assembly board, and a horizontal carrier. The horizontal carrier is connected to a top end of the assembly board. The assembly board is connected to one side of the connecting bracket, and can be adjusted to different positions of the connecting bracket. Therefore, the horizontal carrier can be adjusted to different heights corresponding with the photography opening of the transferring board.

10 Claims, 12 Drawing Sheets

TELEPROMPTER

CROSS-REFERENCE TO RELATED PATENT APPLICATION

This application claims the benefit of priority to Taiwan Patent Application No. 112140480, filed on Oct. 24, 2023. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a teleprompter, and more particularly to a teleprompter that is used to display the text content to the speaker, and can also record through the teleprompter at the same time.

BACKGROUND OF THE DISCLOSURE

A teleprompter includes a coated glass, so that it can display the text content of a display monitor to a speaker (e.g., at a conference), and a video recording device can also record through the teleprompter at the same time. The teleprompter usually has a supporting seat. The display monitor and the video recording device are disposed on the supporting seat. When users change different types of video recording equipment according to different recording scenes, or change display monitors of different sizes, the position of the video recording equipment needs to be adjusted simultaneously. However, a position of the video recording equipment cannot be flexibly adjusted in the conventional teleprompter.

SUMMARY OF THE DISCLOSURE

In response to the above-referenced technical inadequacies, the present disclosure provides a teleprompter which allows for convenient adjustment of a position of a video recording device.

In order to solve the above-mentioned problems, one of the technical aspects adopted by the present disclosure is to provide a teleprompter. The teleprompter includes a connecting bracket, a prompting optical mechanism, a transferring board, and a supporting seat. The connecting bracket is configured to support a monitor assembly. The prompting optical mechanism includes a main housing, a front housing frame, a rear housing frame, and a splitter. A bottom of the main housing is connected with the connecting bracket. The front housing frame is located at a front end of the main housing. The rear housing frame is located at a rear end of the main housing. The splitter is fixed to the front housing frame. The transferring board is detachably connected to the rear housing frame, and has a photography opening. The supporting seat includes an assembly board, and a horizontal carrier. The horizontal carrier is connected to a top end of the assembly board. The assembly board is connected to one side of the connecting bracket and can be adjusted to different positions of the connecting bracket, so that the horizontal carrier can be adjusted to different heights relative to the photography opening of the rear housing frame.

Therefore, in the teleprompter provided by the present disclosure, the transferring board is detachably connected to the rear housing frame, and the horizontal carrier of the supporting seat can be adjusted to different heights relative to the photography opening of the rear housing frame, so as to improve the convenience of adjusting the video recording device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
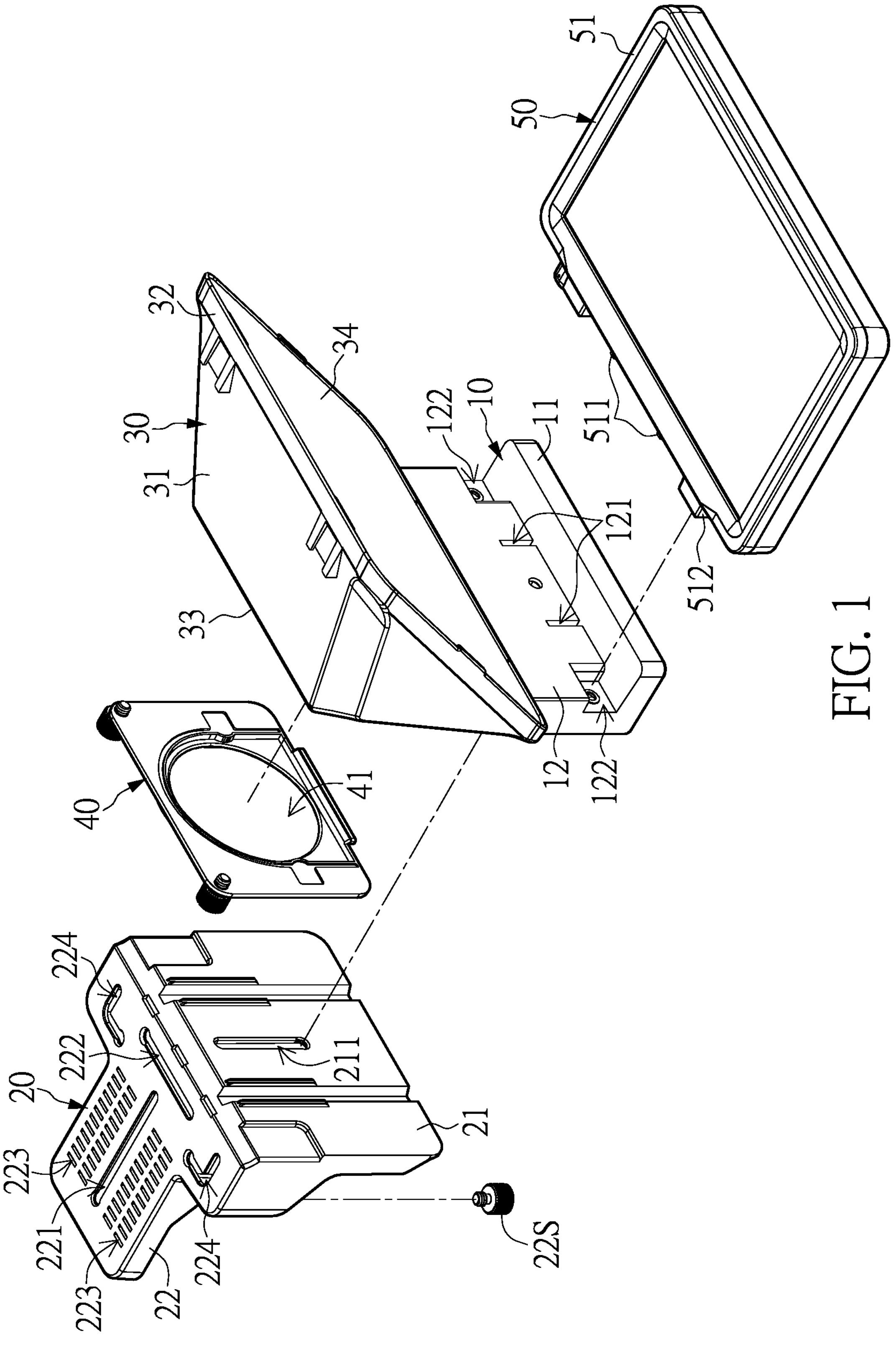
FIG. 1 is a schematic perspective exploded view of a teleprompter according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a,” “an” and “the” includes plural reference, and the meaning of “in” includes “in” and “on.” Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure provides a teleprompter. The teleprompter includes a connecting bracket 10, a supporting seat 20, a prompting optical mechanism 30, and a transferring board 40.

The connecting bracket 10 is used to support a monitor assembly 50. The connecting bracket 10 includes a bracket baseplate 11, and a vertical plate 12. The vertical plate 12 is erectly connected to one side of the bracket baseplate 11. The prompting optical mechanism 30 is connected to a top end of the vertical plate 12. The monitor assembly 50 is screwed to the vertical plate 12 and abutted against the bracket baseplate 11.

Figure 2:
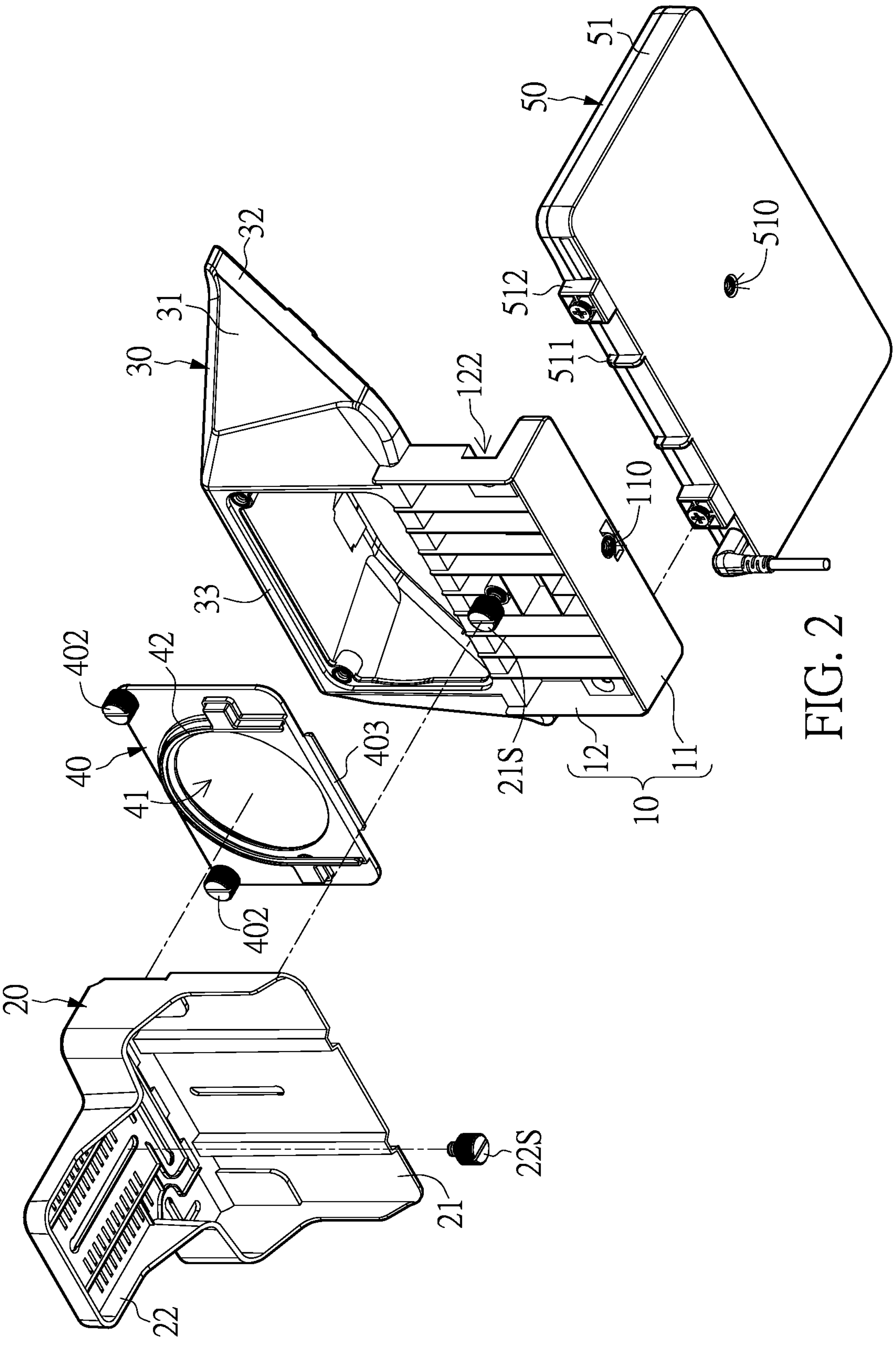
FIG. 2 is a schematic bottom exploded view of the teleprompter according to the first embodiment of the present disclosure.

Referring to FIG. 1, to stably connect the monitor assembly 50 in this embodiment, the vertical plate 12 includes two locating slots 121, and two screwing recesses 122. The two screwing recesses 122 are located at outermost sides of the vertical plate 12, and the two locating slots 121 are located between the two screwing recesses 122. Referring to FIG. 2, the monitor assembly 50 includes an outer case 51. The outer case 51 is substantially in a shape of a frame, and receives a display screen therein, such as a tablet or mobile phone. The outer case 51 includes two positioning tabs 511, and two screwing joints 512. The two positioning tabs 511 are inserted in the two locating slots 121, respectively. The two screwing joints 512 are received in the two screwing recesses 122, respectively. However, the present disclosure is not limited thereto. The quantity of the locating slot, the screwing recess, the positioning tab, and the screwing joint can be at least one.

More specifically, a bottom of the teleprompter can be displaced on a platform or connected to a mounting tripod (not shown). A bottom of the bracket baseplate 11 includes a baseplate screw hole 110, such as a ¼ inch screwing hole. A bottom surface of the outer case 51 of the monitor assembly 50 has a case screw hole 510, for example, ¼ inch screw hole. These screw holes can be applied to the available ¼ inch pan-tilt screw, and can be applied to tripods with quick-release platforms.

The prompting optical mechanism 30 includes a main housing 31, a front housing frame 32, a rear housing frame 33, and a splitter 34. A bottom portion of the main housing 31 is connected to the connecting bracket 10. The front housing frame 32 is arranged at a front end of the main housing 31. The rear housing frame 33 is arranged at a rear end of the main housing 31. The splitter 34 is fixed to the front housing frame 32. The splitter 34 has a function of semi-transmission and semi-reflection, so that the content of the monitor assembly 50 can be reflected to a speaker, and a video recording device can also take pictures through the splitter 34. In this embodiment, for convenience of description, a front end refers to the end relatively closer to the user, and a back end refers to the other end farther away from the user, but it is not intended to limit the present disclosure.

More specifically, when the teleprompter is used in a dark environment, a strong light projected by the display screen of the monitor assembly 50 may pass through the splitter 34 and then be reflected from the inner side of the main housing 31 to the splitter 34. Thus, the video recording equipment (not shown) may be damaged due to the glare effect caused by some blue light was recorded. To solve the above problem, in this embodiment, an inner side of the main housing 13 is formed with a matte surface having a microstructure, such as decorated, sandblasted, or spray painted. Such arrangement can reduce a reflected light from the inner side of the main housing 31, so as to reduce glare in photography.

Figure 3:
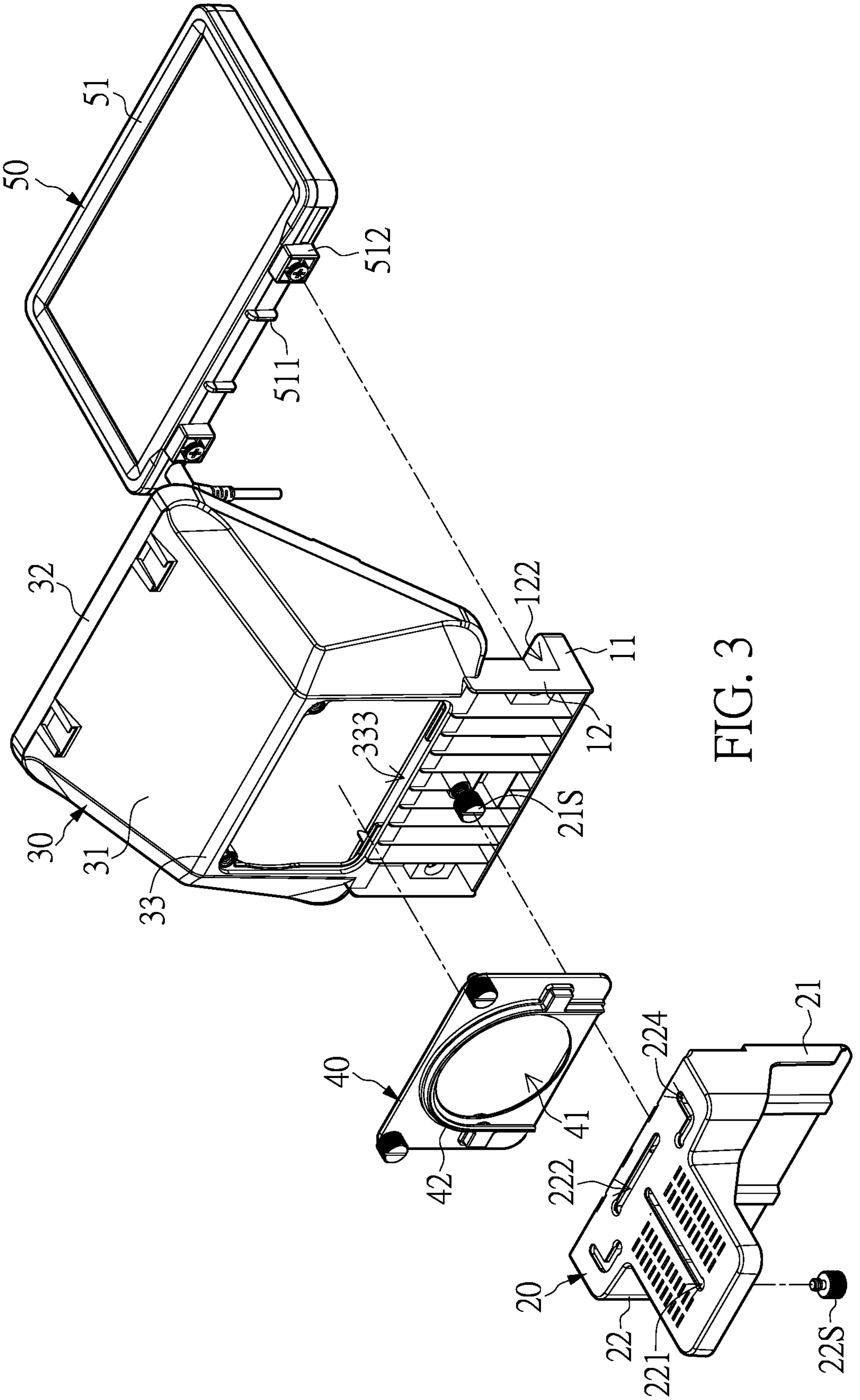
FIG. 3 is a schematic top exploded view of the teleprompter according to the first embodiment of the present disclosure.
Figure 4:
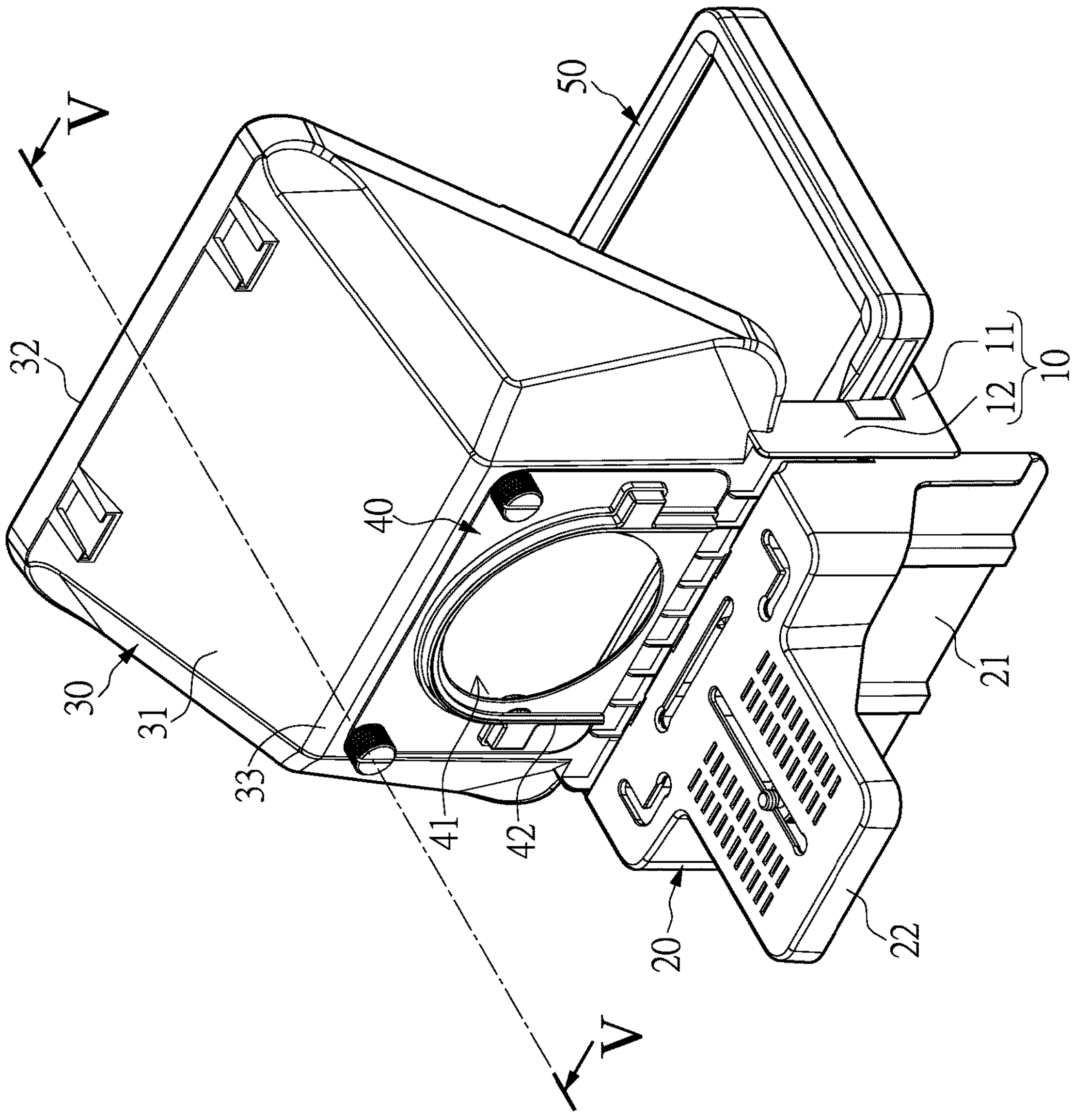
FIG. 4 is a schematic perspective assembled view of the teleprompter according to the first embodiment of the present disclosure.

The transferring board 40 is detachably connected to the rear housing frame 33. Through the interchangeable transferring board 40 provided by this embodiment, the prompting optical mechanism 30 can be adapted to different video recording devices, for example, a camera, a video camera, or a mobile phone. The transferring board 40 has a photography opening 41. The shape of the transferring board 40 of this embodiment corresponds to an opening shape of the rear housing frame 33 of the prompting optical mechanism 30. In detail, the openings of the transferring board 40 and the rear housing frame 33 are both rectangular. Referring to FIG. 2, the transferring board 40 is connected to the corners of the rear housing frame 33 by two quick-release screws 402. The transferring board 40 further includes a bottom inserting tab 403. Referring to FIG. 3, the bottom inserting tab 403 is protruded slightly forward and downward from the transferring board 40, and can be inserted in the bottom slot 333 of the photography opening 41.

In this embodiment, the transferring board 40 further includes a U-shaped rib 42. The U-shaped rib 42 is formed on a periphery of the photography opening 41, and protrudes in a direction away from the prompting optical mechanism 30. The U-shaped rib 42 can fit around a photographic lens to provide positioning and partial light shielding.

The supporting seat 20 includes an assembly board 21, and a horizontal carrier 22. The horizontal carrier 22 is connected to a top end of the assembly board 21. The assembly board 21 is connected to one side of the connecting bracket 10, and a height of the assembly board 21 relative to the connecting bracket 10 is adjustable. Thus, the supporting seat 20 can be adjusted in a different height. In this embodiment, the rear side of the vertical plate 12 of the connecting bracket 10 is flush with the rear housing frame 33 of the prompting optical mechanism 30. Therefore, the horizontal carrier 22 can be adjusted to different heights relative to the photography opening 41 of the rear housing frame 33. In principle, the horizontal carrier 22 is located below the rear housing frame 33.

The assembly board 21 includes a vertical assembling slot 211, and an adjusting screw 21S. The adjusting screw 21S passes through the vertical assembling slot 211 and is screwed to one side of the vertical plate 12 of the connecting bracket 10, that is, a rear side of the vertical plate 12.

Referring to FIG. 1 and FIG. 3, the horizontal carrier 22 includes a first position adjusting slot 221 and a second position adjusting slot 222. The first position adjusting slot 221 extends away from the prompting optical mechanism 30. The second position adjusting slot 222 is perpendicular to the first position adjusting slot 221. The horizontal carrier 22 can support a video recorder (not shown), or a clamp (not shown). The clamp can be formed with a clamping slot to hold a mobile phone, or a tablet. A bottom of the clamp can be connected to any one of position adjustment slots by a platform screw 22S. More specifically, the first position adjusting slot 221 is parallel to the direction of photography, and can be used to adjust a distance between the video recording device and the transferring board 40. The second position adjusting slot 222 is parallel to the transferring board 40, and can be used to adjust the video recording device to a left or right position, so that the lens can be aligned with the photography opening 41 of the transferring board 40.

In this embodiment, the horizontal carrier 22 further includes a plurality of anti-slip strips 223. The anti-slip strips 223 are arranged at two sides of the first position adjusting slot 221. In addition, the horizontal carrier 22 further includes two L-shaped positioning notches 224. The two L-shaped positioning notches 224 are located at two sides of the second position adjusting slot 222. The L-shaped positioning notches 224 can be used to receive a lateral clamp (not shown), so as to clamp one side of the video recording device.

Figure 5:
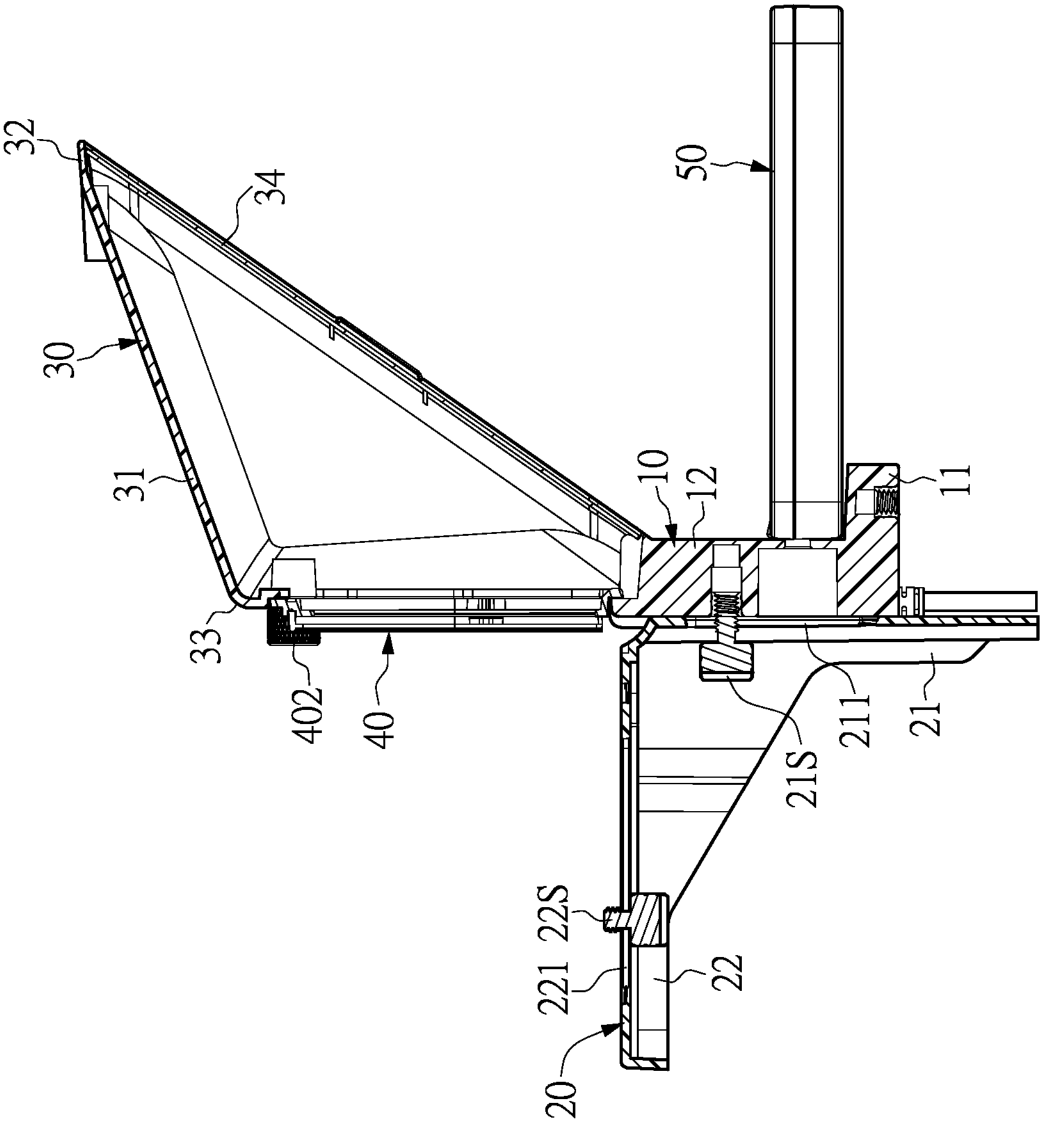
FIG. 5 is a schematic cross-sectional view of the teleprompter taken along line V-V of FIG. 4 according to the first embodiment of the present disclosure.
Figure 6:
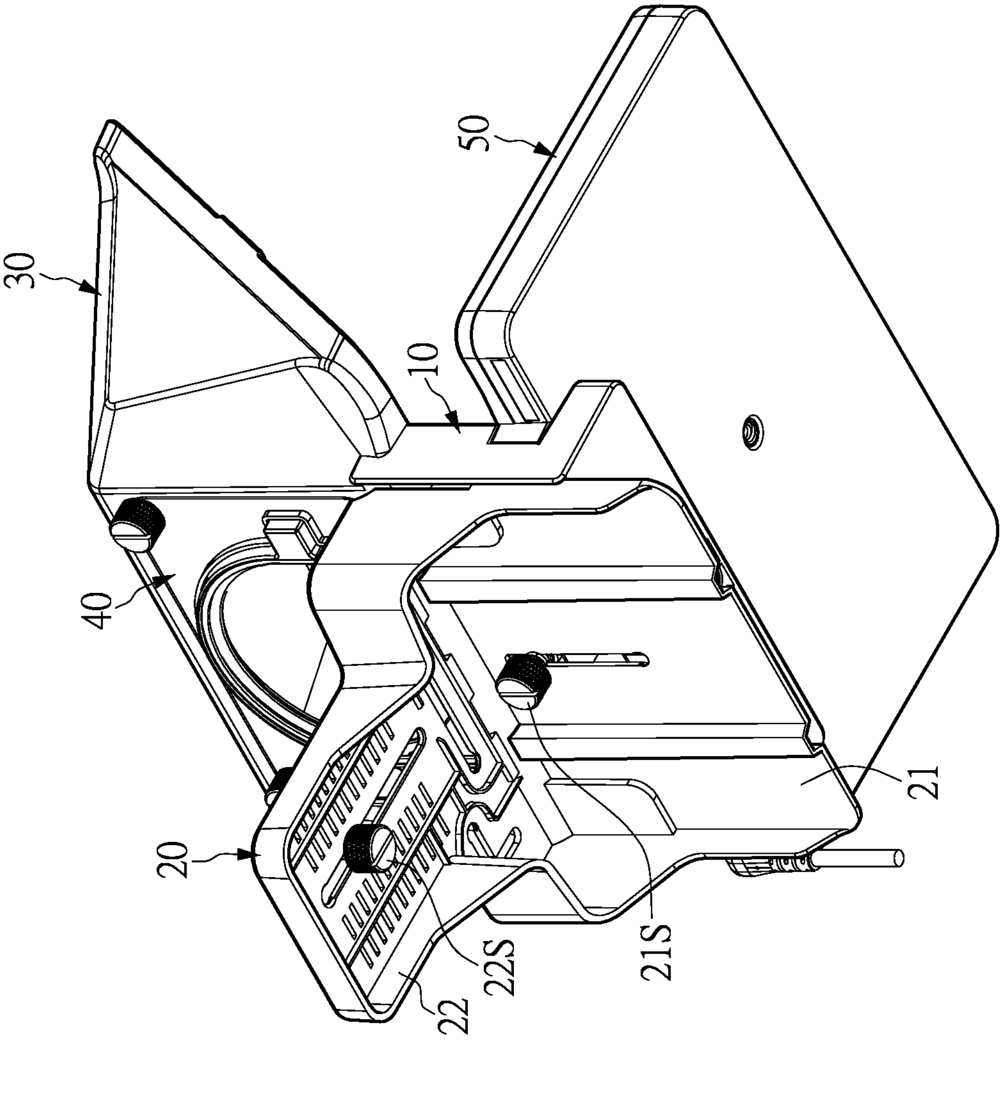
FIG. 6 is a bottom perspective assembled view of the teleprompter according to the first embodiment of the present disclosure.
Figure 7:
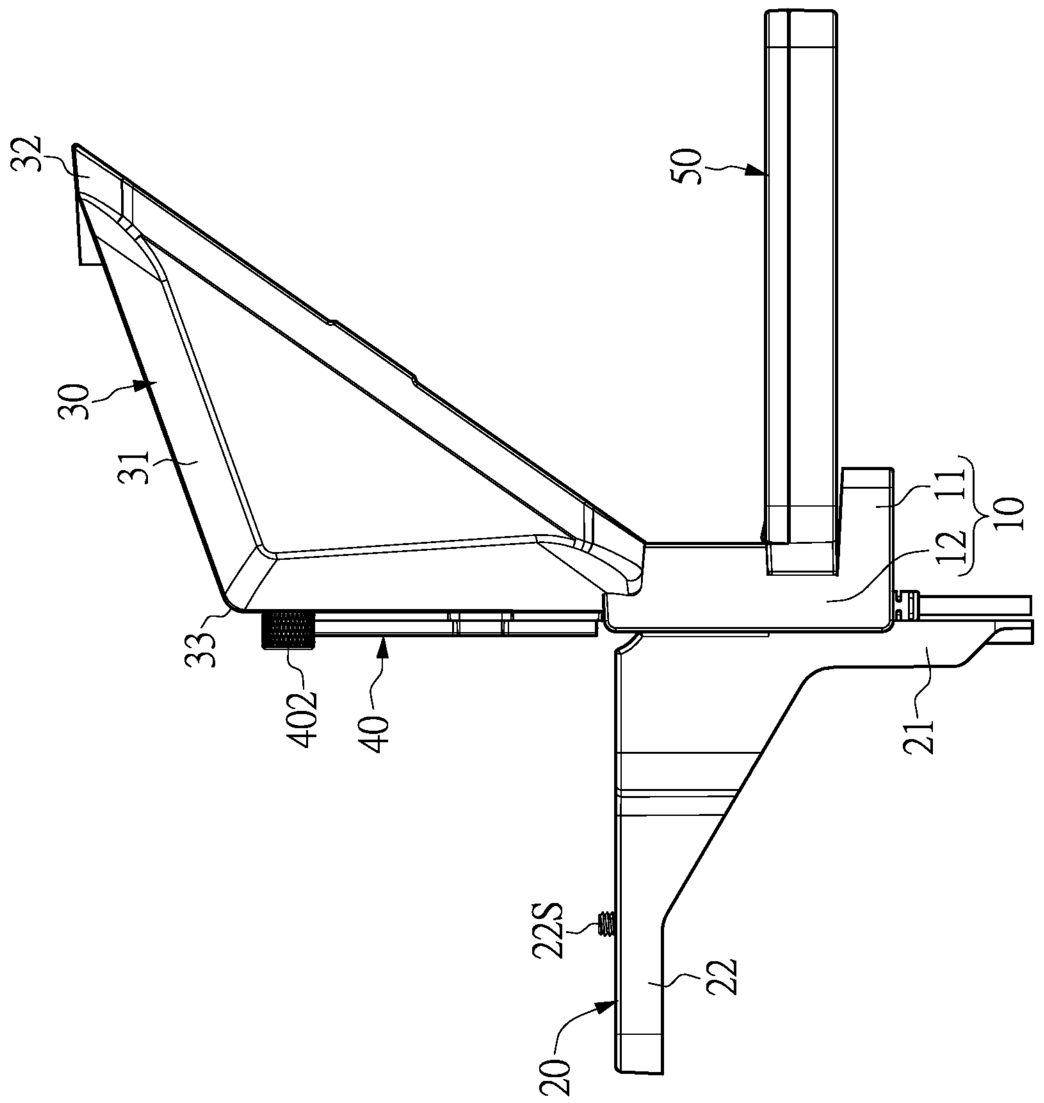
FIG. 7 is a side view of the teleprompter according to the first embodiment of the present disclosure.

Referring to FIG. 5 to FIG. 7, in this embodiment, the operator can adjust a horizontal height of the horizontal carrier 22 of the supporting seat 20 by rotating the adjusting screw 21S. In other words, the video recording device (not shown) on the horizontal carrier 22 can be adjusted to different heights, so that the lens of the video recording device can be adjusted to align to the photography opening 41 of the transferring board 40. In addition, by rotating the platform screw 22S, the operator can adjust the clamp (not shown) on the horizontal carrier 22 to change the video recording device (not shown) to a left or right position.

Second Embodiment

Figure 8:
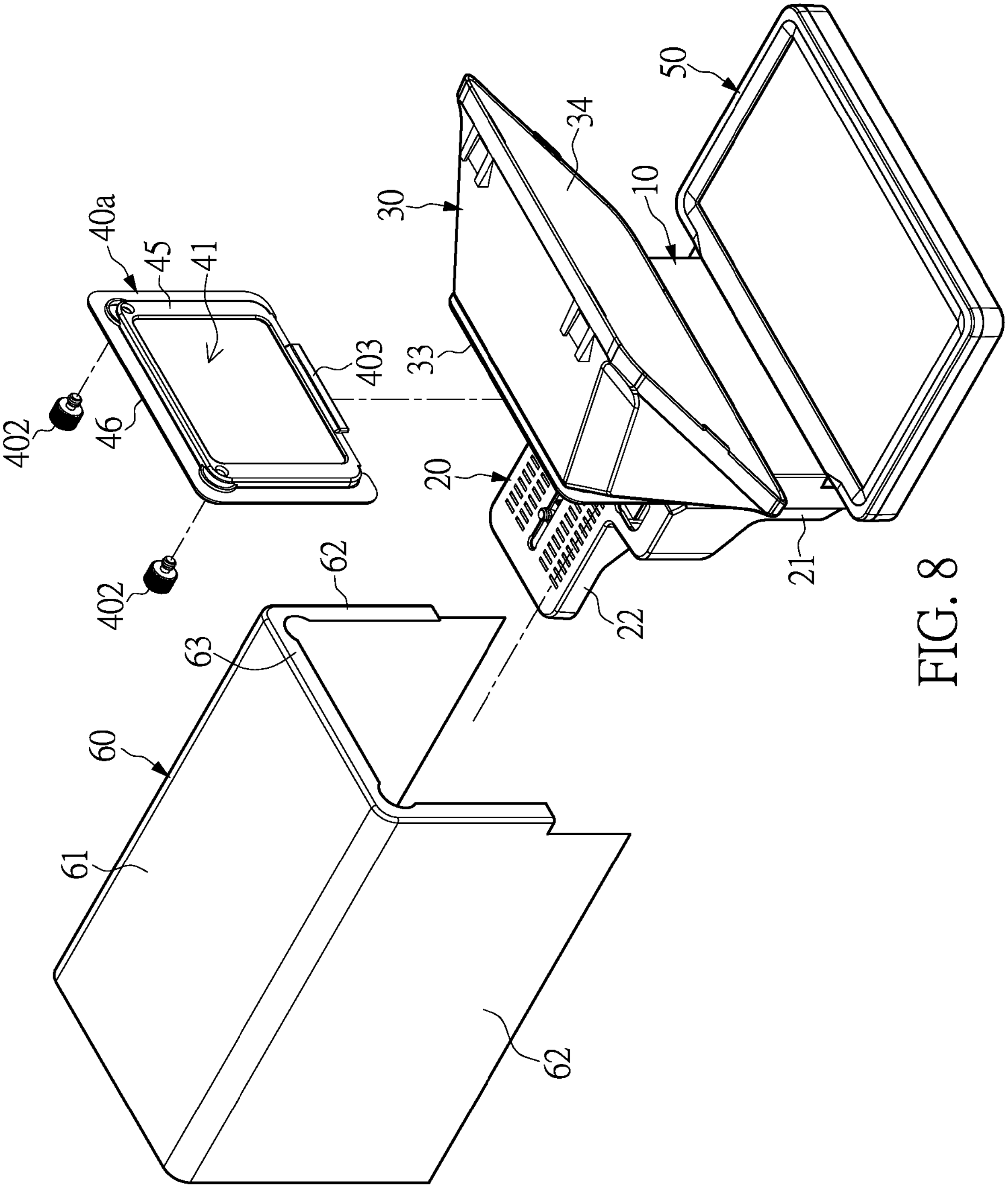
FIG. 8 is a schematic perspective exploded view of the teleprompter according to a second embodiment of the present disclosure.
Figure 9:
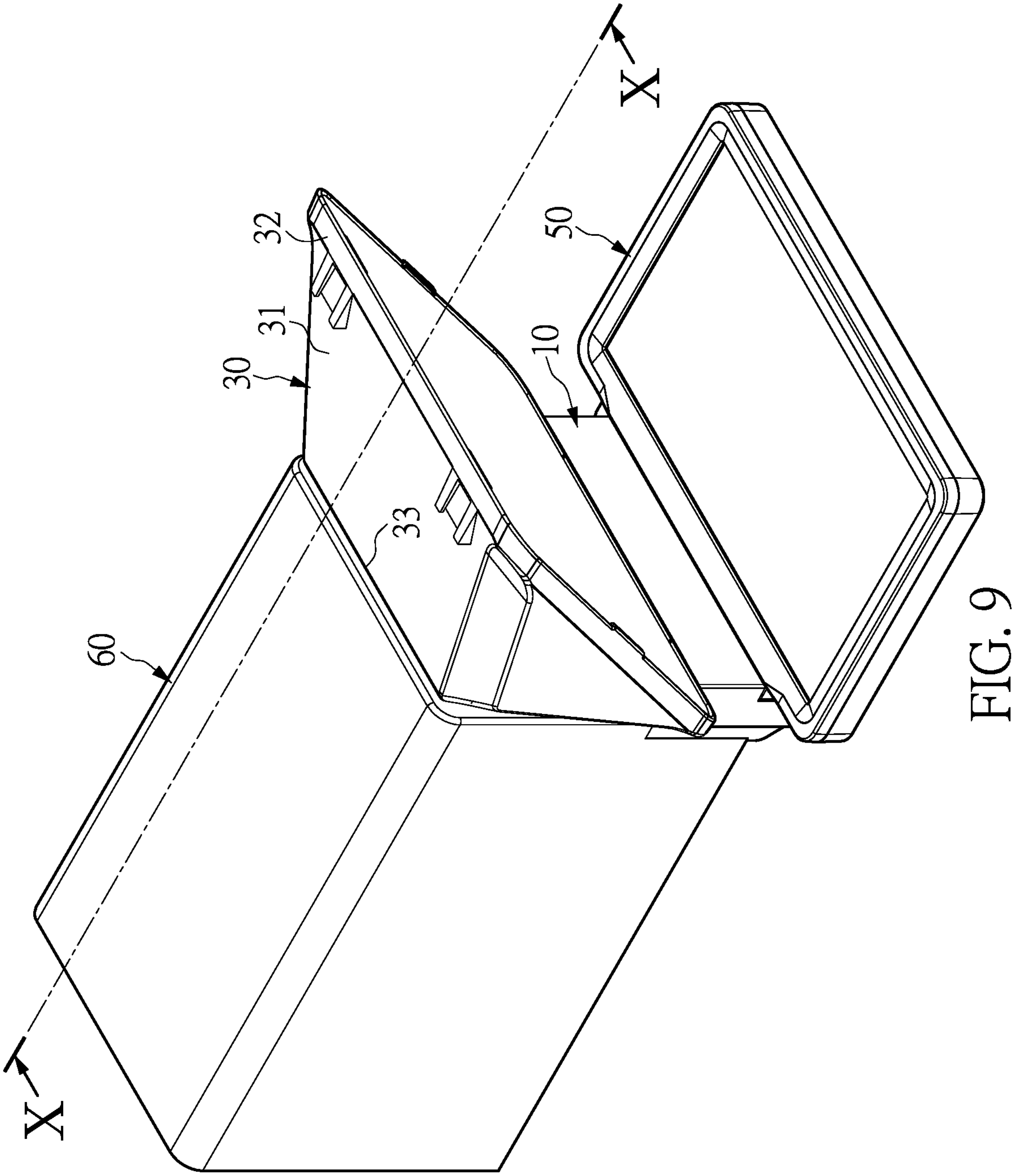
FIG. 9 is a schematic perspective assembled view of the teleprompter according to the second embodiment of the present disclosure.
Figure 10:
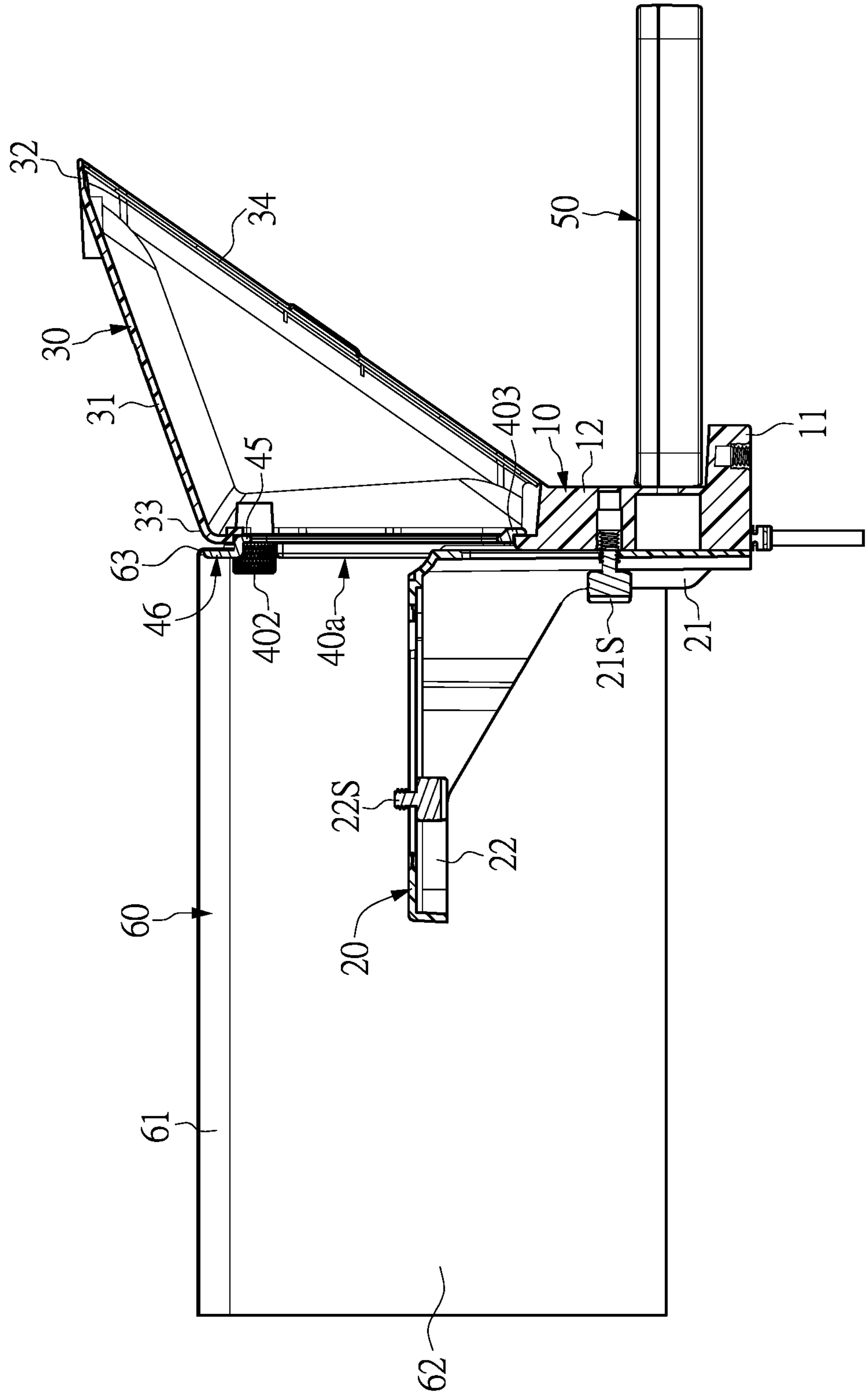
FIG. 10 is a cross-sectional view of the teleprompter taken along line X-X of FIG. 9 according to the second embodiment of the present disclosure.

Referring to FIG. 8 to FIG. 10, a second embodiment of the teleprompter according to the present disclosure. The difference between the first and second embodiments is that, the teleprompter of this embodiment has a transferring board 40*a* and a shading cover 60. Referring to FIG. 10, in this embodiment, the transferring board 40*a* includes an inner frame 45 and an outer frame 46. The quick-release screw 402 fixedly screws the inner frame 45 to the rear housing frame 33. The bottom inserting tab 403 is connected to a bottom edge of the inner frame 45, so that the transferring board 40*a* can be inserted fixedly in a lower edge of the rear housing frame 33. The outer frame 46 is connected to an outer edge of the inner frame 45. The outer frame 46 extends rearward and upward from the inner frame 45. The outer frame 46 and the inner frame 45 are staggered, and a gap is formed between the outer frame 46 and the rear housing frame 33.

The shading cover 60 is detachably docked around a periphery of the transferring board 40*a*. In detail, the shading cover 60 includes a top wall 61, a pair of side walls 62, and a front positioning frame 63. The pair of side walls 62 is connected to two sides of the top wall 61, and extends downward to the connecting bracket 10. The front positioning frame 63 is connected to front edges of the top wall 61 and the side walls 62. The front positioning frame 63 of the shading cover 60 can be inserted between the outer frame 46 and the rear housing frame 33, and is abutted against the inner frame 45. The shading cover 60 can be made of opaque material.

Third Embodiment

Figure 11:
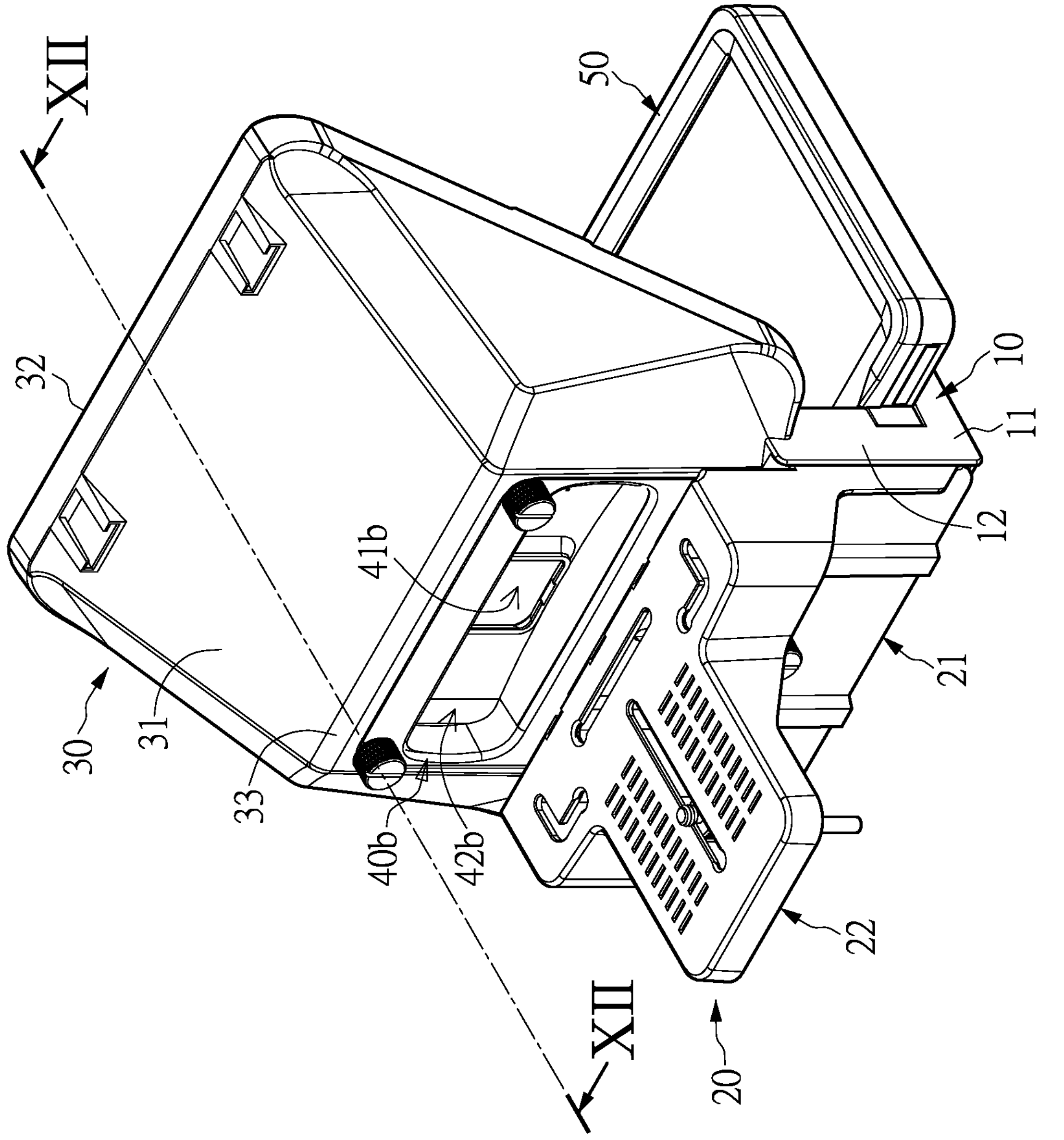
FIG. 11 is a schematic perspective assembled view of the teleprompter according to a third embodiment of the present disclosure.
Figure 12:
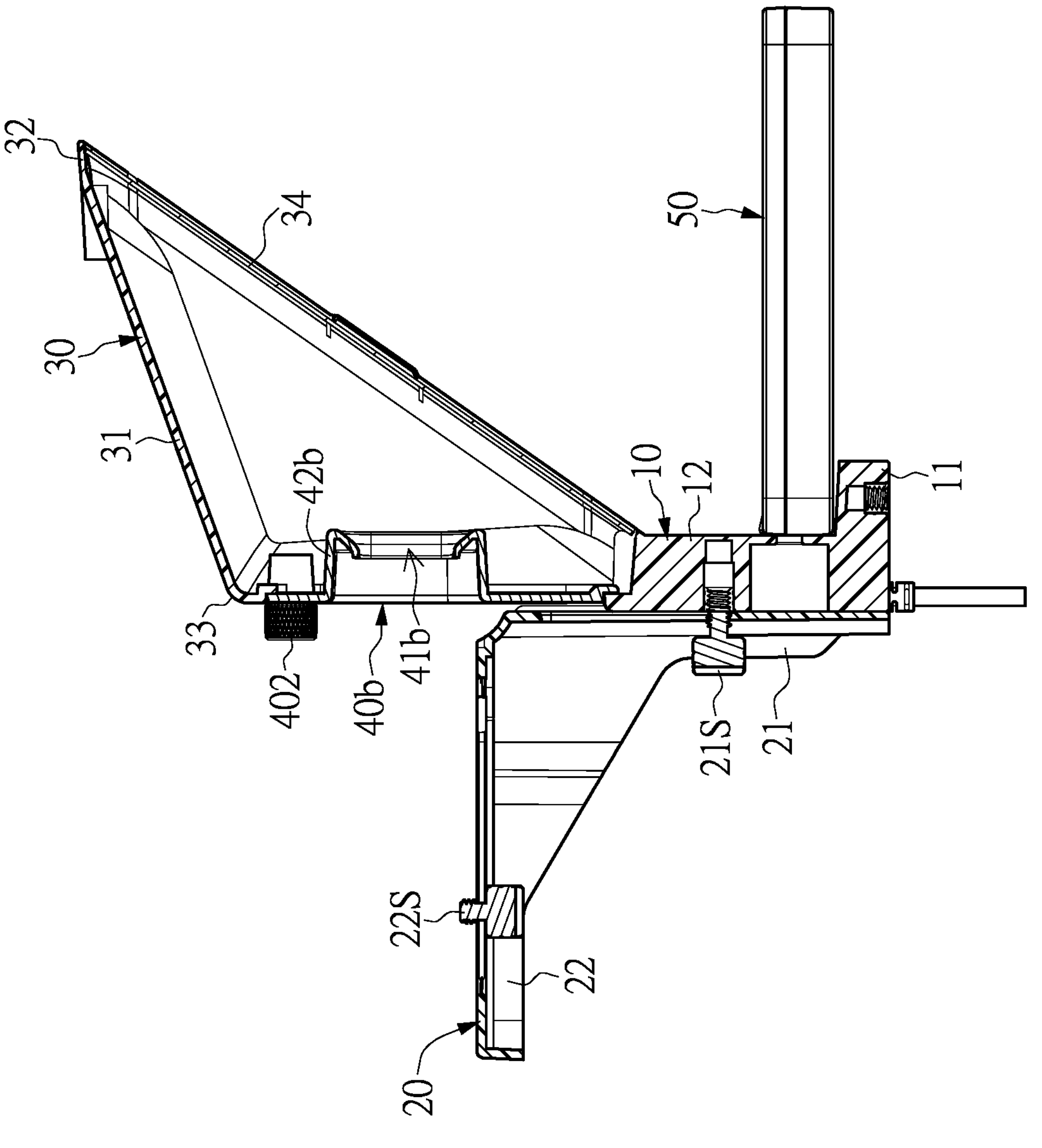
FIG. 12 is a cross-sectional view of the teleprompter taken along line XII-XII of FIG. 11 according to the third embodiment of the present disclosure.

Referring to FIG. 11 to FIG. 13, this embodiment illustrates the transferring board that is replaceable according to the present disclosure. The transferring board 40*b* includes a shading recess portion 42*b*. The shading recess portion 42*b* extends toward the prompting optical mechanism 30. More specifically, the shading recess portion 42*b* extends toward an interior of the main housing 31. The photography opening 41*b* is formed at an inner side of the shading recess portion 42*b*. The shape of the photography opening 41*b* of this embodiment is slightly rectangular, which is different from the above embodiment.

The transfer board 40*b* of this embodiment can be applied to photography equipment with slightly-protruding lenses, such as mobile phones. The shading recess portion 42*b* can provide the effect of blocking external light.

BENEFICIAL EFFECTS OF THE EMBODIMENTS

In conclusion, in the teleprompter provided by the present disclosure, the transferring board is detachably connected to the rear housing frame, and the horizontal carrier of the supporting seat can be adjusted to different heights relative to the photography opening of the rear housing frame, so as to improve the convenience of adjusting the video recording device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A teleprompter, comprising:

a connecting bracket being configured to support a monitor assembly;

a prompting optical mechanism including a main housing, a front housing frame, a rear housing frame, and a splitter; wherein a bottom of the main housing is connected with the connecting bracket, the front housing frame is located at a front end of the main housing, the rear housing frame is located at a rear end of the main housing, and the splitter is fixed to the front housing frame;

a transferring board detachably connected to the rear housing frame, the transferring board having a photography opening; and a supporting seat including an assembly board, and a horizontal carrier, the horizontal carrier being connected to a top end of the assembly board, the assembly board being connected to one side of the connecting bracket and being able to be adjusted to different positions of the connecting bracket, so that the horizontal carrier is able to be adjusted to different heights relative to the photography opening of the rear housing frame;

wherein the connecting bracket includes a bracket baseplate and a vertical plate, the vertical plate is erectly connected to one side of the bracket baseplate, the prompting optical mechanism is connected to a top end of the vertical plate, and the monitor assembly is screwed to the vertical plate and is abutted against the bracket baseplate;

wherein the vertical plate includes at least one locating slot and at least one screwing recess, the monitor assembly includes an outer case, the outer case includes at least one positioning tab and at least one screwing joint, the at least one positioning tab is inserted in the locating slot, and the at least one screwing joint is received in the at least one screwing recess.

2. The teleprompter according to claim 1, wherein the assembly board includes a vertical assembling slot, the assembly board includes an adjusting screw, the adjusting screw passes through the vertical assembling slot and is screwed to one side of the vertical plate of the connecting bracket.

3. The teleprompter according to claim 1, wherein the horizontal carrier includes a first position adjusting slot and a second position adjusting slot, the first position adjusting slot extends toward a direction that is away from the prompting optical mechanism, and the second position adjusting slot is perpendicular to the first position adjusting slot.

4. The teleprompter according to claim 3, wherein the horizontal carrier further includes a plurality of anti-slip strips, the plurality of anti-slip strips are arranged at two sides of the first position adjusting slot.

5. The teleprompter according to claim 3, wherein the horizontal carrier further includes two L-shaped positioning notches, the two L-shaped positioning notches are respectively located at two sides of the second position adjusting slot.

6. The teleprompter according to claim 1, wherein the transferring board further includes a U-shaped rib, the U-shaped rib is disposed on a periphery of the photography opening and protrudes toward a direction away the prompting optical mechanism.

7. The teleprompter according to claim 1, wherein the transferring board further includes a shading recess portion, the shading recess portion extends toward the prompting optical mechanism, and the photography opening is formed at one side of the shading recess portion.

8. A teleprompter, comprising:

a connecting bracket being configured to support a monitor assembly;

a prompting optical mechanism including a main housing, a front housing frame, a rear housing frame, and a splitter; wherein a bottom of the main housing is connected with the connecting bracket, the front housing frame is located at a front end of the main housing, the rear housing frame is located at a rear end of the main housing, and the splitter is fixed to the front housing frame;

a transferring board detachably connected to the rear housing frame, the transferring board having a photography opening;

a supporting seat including an assembly board, and a horizontal carrier, the horizontal carrier being connected to a top end of the assembly board, the assembly board being connected to one side of the connecting bracket and being able to be adjusted to different positions of the connecting bracket, so that the horizontal carrier is able to be adjusted to different heights relative to the photography opening of the rear housing frame; and a shading cover, wherein the shading cover is detachably connected to a periphery of the transferring board, the shading cover includes a top wall, a pair of side walls, and a front positioning frame, the pair of side walls is respectively connected to two sides of the top wall and extends downward to the connecting bracket, the front positioning frame is connected to a front edge of the top wall and the side walls; wherein the transferring board includes an inner frame and an outer frame, the inner frame is fixedly screwed to the rear housing frame, the outer frame is connected to an outer edge of the inner frame, and the outer frame extends from the inner frame rearward and upward; and wherein the front positioning frame is inserted between the outer frame the rear housing frame, and is abutted against the inner frame.

9. The teleprompter according to claim 1, wherein an inner side of the main housing is formed with a matte surface having a microstructure.

10. A teleprompter, comprising:

a connecting bracket being configured to support a monitor assembly;

a prompting optical mechanism including a main housing, a front housing frame, a rear housing frame, and a splitter; wherein a bottom of the main housing is connected with the connecting bracket, the front housing frame is located at a front end of the main housing, the rear housing frame is located at a rear end of the main housing, and the splitter is fixed to the front housing frame;

a transferring board detachably connected to the rear housing frame, the transferring board having a photography opening; and a supporting seat including an assembly board, and a horizontal carrier, the horizontal carrier being connected to a top end of the assembly board, the assembly board being connected to one side of the connecting bracket and being able to be adjusted to different positions of the connecting bracket, so that the horizontal carrier is able to be adjusted to different heights relative to the photography opening of the rear housing frame;

wherein the connecting bracket includes a bracket baseplate and a vertical plate, the vertical plate is erectly connected to one side of the bracket baseplate, the prompting optical mechanism is connected to a top end of the vertical plate, and the monitor assembly is screwed to the vertical plate and is abutted against the bracket baseplate;

wherein the horizontal carrier includes a first position adjusting slot and a second position adjusting slot, the first position adjusting slot extends toward a direction that is away from the prompting optical mechanism, and the second position adjusting slot is perpendicular to the first position adjusting slot.

* * * * *